United States Patent [19]

Wagnon

[11] 4,071,175
[45] Jan. 31, 1978

[54] ANTI-RATTLE BICYCLE BEVERAGE CONTAINER HOLDER

[76] Inventor: Van C. Wagnon, 27257 Wells Lane, Conroe, Tex. 77301

[21] Appl. No.: 702,926

[22] Filed: July 6, 1976

Related U.S. Application Data

[63] Continuation-in-part of Ser. No. 563,452, March 31, 1975, Pat. No. 3,928,284.

[51] Int. Cl.² .............................................. B62J 7/06
[52] U.S. Cl. ...................................... 224/36; 224/41; 248/15
[58] Field of Search ............... 224/30 R, 32 R, 33 A, 224/36, 41, 39 R, 42–46 R, 29 R, 29 B; 248/15, 16, 20, 21, 22

[56] References Cited

U.S. PATENT DOCUMENTS

2,926,828  3/1960  Kuddie .......................... 224/42.46 R

FOREIGN PATENT DOCUMENTS

| 241,729 | 12/1911 | Germany | 224/41 |
| 190,565 | 8/1906 | Germany | 224/39 R |
| 618,943 | 9/1936 | Germany | 224/39 R |
| 434,799 | 3/1948 | Italy | 224/32 R |

*Primary Examiner*—Robert J. Spar
*Assistant Examiner*—Jerold M. Forsberg
*Attorney, Agent, or Firm*—Cushman, Darby & Cushman

[57] ABSTRACT

A holder for beverage cans or the like for mounting on bicycle handlebars or the like. The holder generally consists of a top plate, a bottom plate, and members for spacing and interconnecting the top and bottom plates. Plastic washers are disposed around the means for interconnecting the top and bottom plates, and they engage a can or the like to be held by the holder and prevent rattling of the can. The top member has an opening formed therein for receipt of a beverage can, which can, when passed through the opening, rest on the bottom plate. One or more extensions of the top plate are integrally formed therewith, which extensions are adapted to be bent around a handlebar into loop form and releasably held in that form for mounting the holder onto the handlebar. The top surface of the top plate is substantially even with the handlebar when mounted by the extensions.

10 Claims, 5 Drawing Figures

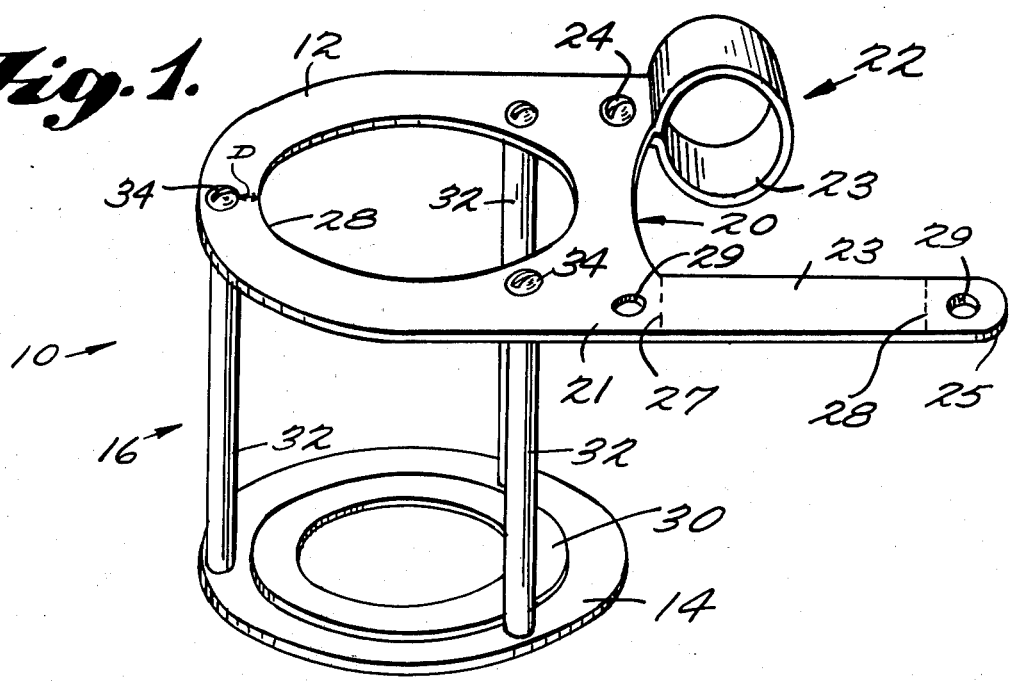
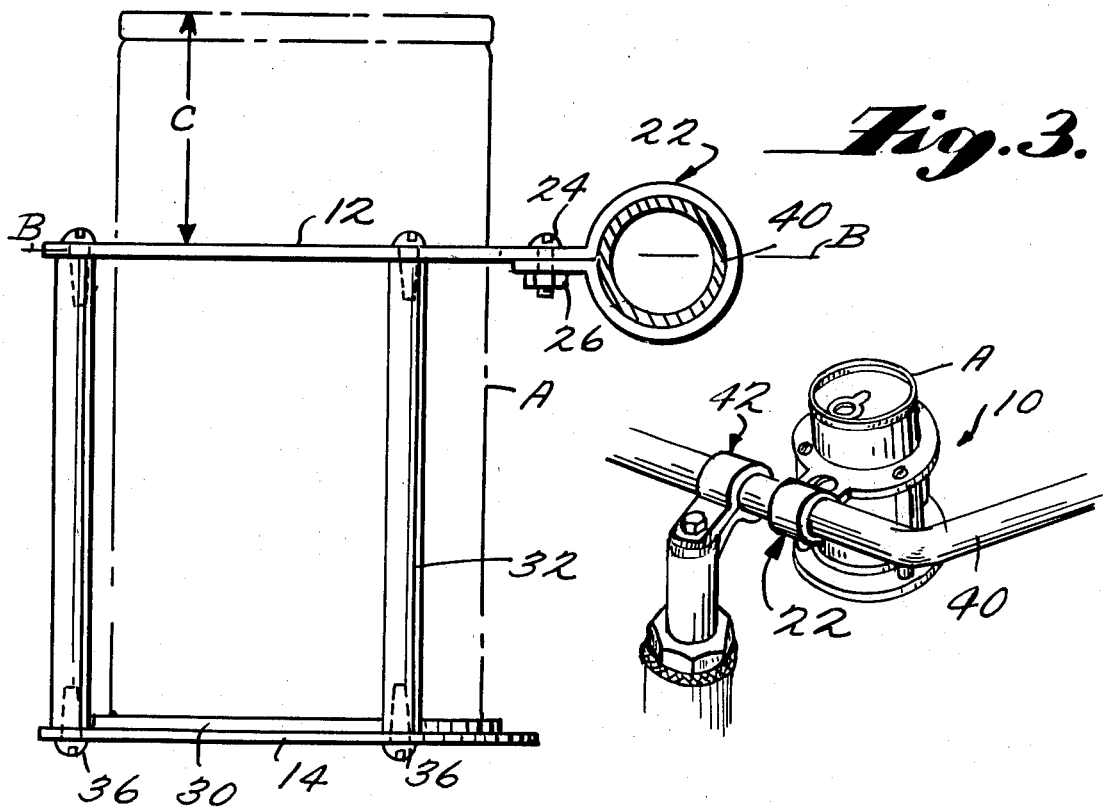

ANTI-RATTLE BICYCLE BEVERAGE CONTAINER HOLDER

CROSS-REFERENCE TO RELATED APPLICATION

This application is a continuation-in-part of my application Ser. No. 563,452, filed Mar. 31, 1975, now Pat. U.S. No. 3,928,284.

BACKGROUND AND SUMMARY OF THE INVENTION

The invention relates to a holder for beverage cans and the like for a bicycle. When one is bicycling, it is often desirable to be able to take periodic drinks from a beverage can or the like. It is not safe of convenient to carry the beverage can in one hand while steering with the other, however, therefore, a holder for the can should be provided. While there have been prior art proposals for mounting beverage containers on the handlebars of a bicycle (see French Pat. Nos. 61,820 and 521,480), such prior art proposed structures are not readily adaptable to mounting on modern bicycles or motorcycles since they have bracket structures that require a special clamp construction of the bicycle handlebar, or require more space than is provided in modern bicycles. Additionally, such prior art structures have relatively complicated or ineffectual means for providing anti-rattling of the beverage container and are not readily susceptible to assembly, disassembly and shipping.

There have been other prior art proposals for beverage container holders, such as shown in U.S. Pat. Nos. 2,926,828 and 3,698,675, that are not adapted for mounting on a bicycle but, rather, in some other environment, and such structures also provide relatively complicated and expensive means for preventing clattering or rattling of containers held thereby, and also are not readily susceptible to assembly and disassembly for shipment thereof. The component parts of such structures are in general relatively difficult and costly to manufacture, while not performing the desired result, according to the present invention, as effectively as the structure according to the present invention.

According to the present invention, many accessory, difficult to manufacture and/or assembly structures of the prior art are eliminated without elimination — in fact enhancement — of their end function.

According to the present invention, a bicycle or motorcycle handlebar-mounted beverage can holder is provided that is ideally suited for ready insertion of a can thereinto and removal of a can therefrom by a rider. The holder, according to the present invention, has the advantages of being able to be broken down for ease of transport, transfer or storage, yet being readily assemblable when desired. It is relatively easy and inexpensive to manufacture. It holds a beverage can or the like without undue clattering thereof with simple plastic washers engaging the can or the like, and it holds the can in a position of ready accessability.

According to the present invention, a beverage can holder is provided that includes a top plate member, a bottom member and means for spacing and interconnecting the top and bottom members. The top plate member contains an opening therein for passage of a can or the like therethrough, and bracket means for mounting the holder are formed integrally with the top member. Plastic washers are disposed around the means for interconnecting the top and bottom plates, and they engage a can or the like to be held by the holder and prevent rattling of the can. The bracket means consists of one or more extensions of the top member which extensions are adapted to be bent around a handlebar into a loop form and then held in the loop form with detachable holding means, such as a nut and screw. The spacing and interconnecting means may comprise a plurality of rod members, each attachable to the top and bottom members by detachable holding means, such as screws. A single screw may fasten each rod member to the top and bottom plates. The bottom member preferably comprises a plate member having a ring or disc of cork or the like formed thereon. When the holder is mounted on handlebars, the plane of the top member passes through the approximate center of the handlebars, and the opening is only slightly spaced from the handlebars, whereby a beverage can or the like held thereby is readily accessible.

It is the primary object of the present invention to provide a beverage can holder specially adapted for a bicycle or motorcycle with simple component parts. This and other objects of the invention will become clear from an inspection of the detailed description of the invention and from the appended claims.

BRIEF DESCRIPTION OF THE DRAWINGS

FIG. 1 is a perspective view of an exemplary beverage can holder according to the present invention;

FIG. 2 is a side view of the device shown in FIG. 3;

FIG. 3 is a perspective view of another embodiment of the beverage can holder, according to the present invention, shown mounted on the handlebar of a bicycle;

DETAILED DESCRIPTION OF THE DRAWINGS

Figure 4:
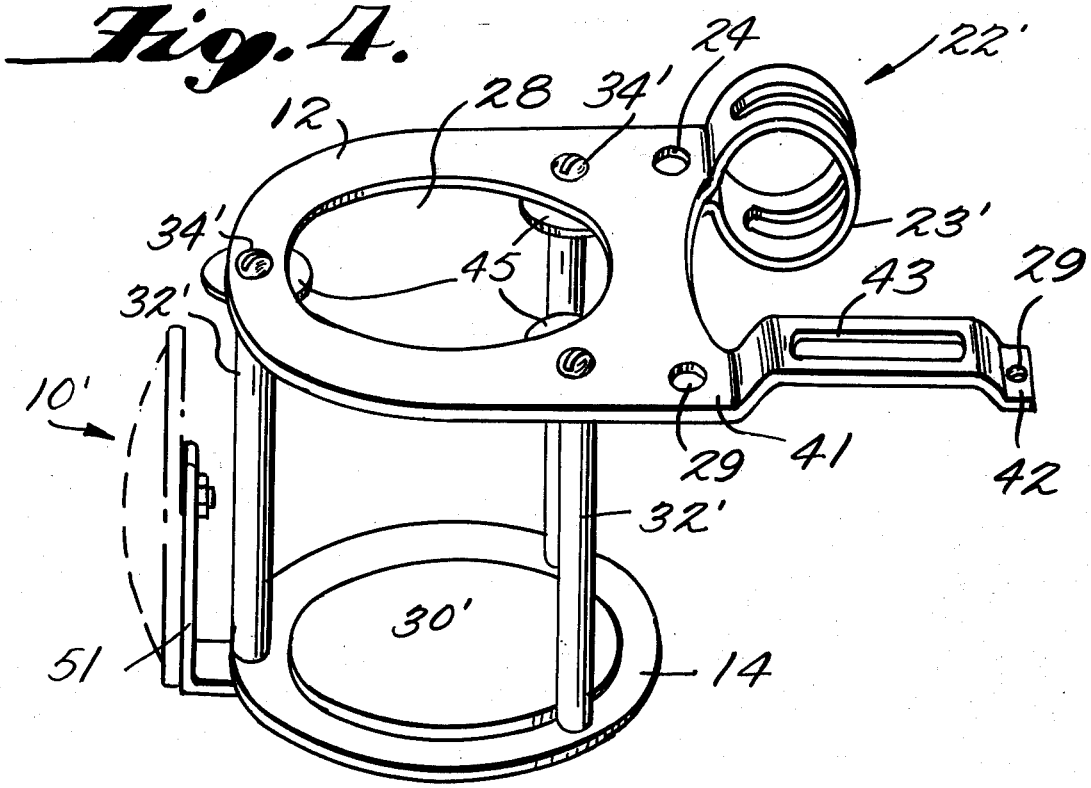
FIG. 4 is a perspective view of another beverage can holder, according to the present invention, having plastic washer anti-rattle means.

An exemplary beverage can holder, according to the present invention, is shown generally at 10 in FIG. 1. The holder 10 generally consists of three parts: a top part 12, a bottom part 14 and means 16 for spacing and interconnecting the top and bottom parts 12, 14. All parts are preferably formed of metal, although other materials are suitable. The top part 12 consists of a single, unitary plate-like member having an opening 28 formed therein, and having at one end 20 thereof one or more formable bracket means 22 for attachment of the holder 10 to the handlebars of a bicycle, motorcycle or the like. It is preferred that either one or two bracket means 22 be provided.

Each of the bracket means 22 consists of an extension 23 of part 12 adapted to be bent into a loop for encircling a handlebar 40. The extension(s) 23 may hold a holder 10 to a handlebar 40 by being bent at portions 27, 28 thereof around the handlebar 40 and then passing a screw 24 or the like through holes 29 or the like formed therein at the ends 21 and 25 of extension 23. The screw 24 or the like may be held in place by a nut 26 or the like.

The bottom part 14 of the holder 10 preferably comprises a plate member of generally the same size and shape as the body portion (without extensions 23) of top part 12, being generally slightly larger in diameter than a can A or the like to be held thereby. A ring of cork 30 or like material may be provided on the top surface of member 14 to prevent a can hold by holder 10 from rattling and for dampening any vibrations which might occur. The opening 28 formed in top part 12 is slightly larger than the diameter of a can A to be held so that a can may be placed therethrough into cooperation with bottom part 14, upon which it will rest.

Means 16 for spacing and connecting the top part 12 and bottom part 14 may take a variety of forms. As shown in the drawings, the means 16 may consist of a plurality of rods 32 (i.e., three) connected to the top and bottom parts 12, 14. Each rod may be connected to part 12 by a screw 34 passing through an opening formed in part 12 and may be connected to bottom part 14 by a screw 36 passing through an opening formed in part 14. By providing detachable connection means 34, 36, the holder 10 may be readily assembled and disassembled for shipment, transfer or storage. The rods 32 are preferably dimensioned so that they are significantly shorter than the length of a can A to be held by the holder 10. In this way, a can A placed in holder 10 will extend a significant distance C above a plane B-B passing through the center of a handlebar 40 and containing the top surface of plate 12. This allows for easy access to the can A by an individual riding a bicycle to which the holder 10 is attached. It is noted that the rods 32 may be spaced from the opening 28 a distance D so that they generally do not contact the sides of a can A held by holder 10. Of course, the means 16 can take other forms, such as a tubular section, however, rods 12 are preferred because of ease of assembly and low manufacturing costs.

It will be seen that when a holder 10 is mounted on a bicycle handlebar 40, the plane B-B of the top surface plate 12 generally passes through the center of handlebar 40. This provides for ready accessibility of a can A held by the holder 10 for a given dimension of the spacing means 16. This is especially important when one is riding a bicycle or motorcycle since one must retain one's balance and should not have to reach in a manner that would tend to throw one's balance off. It will be noted that while the modification of the invention shown in FIG. 2 may be mounted at any point along the handlebar 40, it is preferred that when the two-bracket embodiment shown in FIG. 1 is used that one bracket means 22 be attached on either side of fork 42.

The invention of FIGS. 1-3, having been described, the method of use thereof will now be set forth. When it is desired to use the holder 10 for holding cans or the like on bicycle handlebars, if the components of the holder 10 are disassembled, they are first assembled. Rods 32 are attached to top and bottom parts 12 and 14, respectively, by screws 34 and 36, respectively, or the like. The extension(s) 23 of top part 12 is then wrapped around a handlebar 40 so that end 25 thereof is aligned with end 21, bends being made at portions 27 and 28 thereof and then screw 24 is passed through openings 29 formed in cooperating portions thereof and the member 23 formed into a loop to form a bracket 22. The holder 10 is then ready for use, it being necessary for an individual to only pass a can A or the like through the opening 28 in top part 12 into engagement with bottom part 14, and the can A will be retained by the portions of plate 12 defining opening 28. Since the bracket means 22 and top plate 12 are unitary and located generally even with the handlebars 40, a can A held thereby is readily accessible even while one is riding and striving to maintain one's balance.

The embodiment of the invention shown in FIG. 4 is similar to the construction in FIG. 1, except that additional, simple anti-rattle means are provided, single bolts extend through each of the holders to attach the top and bottom plates together (whereby the holder is easier to manufacture and assemble), the bracket means may more readily be conformed to handlebars and a bracket for mounting a reflector is associated therewith.

Figure 5:
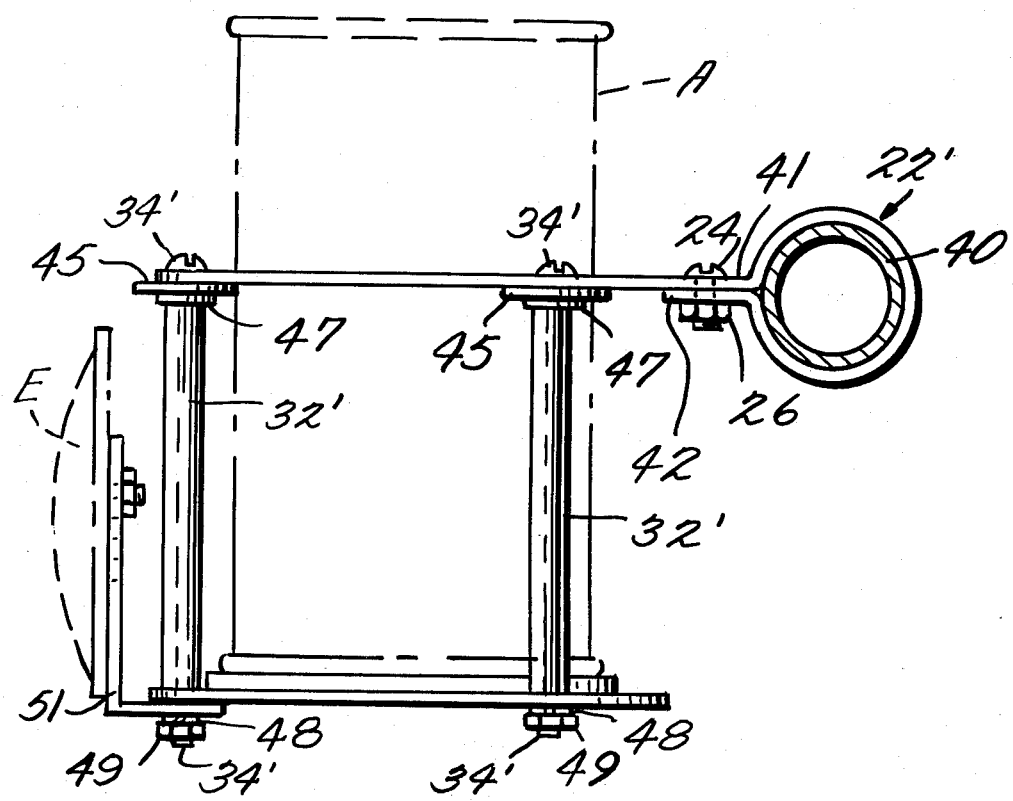
FIG. 5 is a side view of the holder of FIG. 4.

The holder 10' shown in FIGS. 4 and 5 has bracket means 22' integral with the top plate 12, the bracket means 22' consisting of an extension(s) 23' that is arched in the center portion thereof (see FIG. 4) and has a slot 43 or the like formed in the interior thereof. The arched construction allows the extension 23' to be readily placed around the handlebar 40 while relatively flat portions 41, 42 thereof remain undeformed for receipt of the screw 24 through openings 29 therein so that they may be fastened together (FIG. 5). The provision of slot 43 saves on material expense and also makes the extension 23' easier to bend around the handlebar 40.

The top and bottom plates 12, 14, respectively, are connected together by a number of bolts 34', each extending through a tubular rod 32' and fastened at the free end thereof by a nut 49. Encircling each bolt 34' and disposed between tubular rod 32' and plate 12 is a resilient material washer 45. The washers 45 may be made of rubber, polyethylene or other suitable plastic (preferably they are made of polyethylene), and they extend radially into opening 28 and engage a can A received by the opening 28 to prevent rattling of the can. The washers 45 are simple and inexpensive to make, are readily assembled with the other holder components, and different size washers may be interchangably assembled in the holder to receive containers A of different diameter or shape. Metal washers 47 may also be provided between the tubes 32' and the washers 45 to prevent damage to the relatively soft material of which the washers 45 are constructed by edges of the tubes 32'. A lock washer 48 may be provided between each nut 49 and the bottom plate 14.

Disposed on the bottom plate 14 of the holder 10' is an additional anti-rattle means, cork disc 30'. The disc 30' may be provided with an adhesive backing and release-paper cover, and when the holder 10' is purchased by the ultimate consumer, the release paper may be removed and the disc 30' placed on the bottom plate 14. A bracket 51 for mounting a reflector E (dotted line in FIG. 5) also may be provided on the front of the holder 10', the bracket having an opening therein receiving the front-most bolt 34', and being held onto the plate 14 by the lock washer 48 and nut 49.

The holder 10' preferably is packaged in unassembled form, it not being necessary for the package to be any thicker than the height of the arched portions 23' of the bracket means 22. The bolts 34' are passed through openings in top plate 12, the polyethylene washers 45 are placed around the bolts 34' and flush against the bottom of plate 12, the metal washers 47 are placed around the bolts 34' and adjacent the washers 45, the tubes 32' are placed around the bolts 34' and the bolts 34' are passed through openings in the bottom plate 14, the lock washers 48 and nuts 49 engaging bolts 34' to hold the plates, washers and tubes together. The reflector bracket also is held on the forwardmost bolt 34' by the nut 49 associated therewith.

While the invention has been herein shown and described in what is presently conceived to be the most practical and preferred embodiment, it will be obvious to one of ordinary skill in the art that many modifications may be made thereof within the scope of the invention. For instance, instead of a can A being held by holder 10, certain bottles and paper cups may also be held thereby. Also, different fastening means besides screws 24, 34 and 36 could also be utilized. Other modifications are also possible, thus it is intended that the invention be accorded the broadest scope of the appended claims so as to encompass all equivalent structures and devices.

What is claimed is:

1. A holder for a beverage can or the like for mounting on a bicycle handlebar or the like, said holder comprising
a top plate member, said top plate member having a generally circular opening therein of slightly larger diameter than the diameter of a can or the like to be held by the holder,
a bottom plate member, said bottom plate member having dimensions generally the same as or greater than the diameter of the opening in said top plate member,
a plurality of rods spacing and interconnecting said top and bottom plate members,
said rods each being of a length substantially less than the length of a can or the like to be held by the holder, whereby a can or the like will have a portion thereof extending substantially upwardly from said top plate member,
a resilient material washer disposed between each of said plurality of rods and said upper plate extending radially into said top plate member opening for engaging and preventing clattering of a beverage can or the like received by the top plate member opening, and
extension means formed integrally with said top plate member for positioning said top plate member on a bicycle handlebar or the like so that the top surface of said top plate member is substantially level with the handlebar or the like, said extension means comprising an elongated strip integral with said top plate member at one end thereof and being free of the other end thereof, and having openings formed therein adjacent either end thereof for receipt of fastening means for holding the extension in the form of a loop wrapped around the handlebar or the like.

2. A holder as recited in claim 1 wherein said bottom plate member has means formed on the top surface thereof for preventing clattering of a can or the like held thereby with the holder.

3. A holder as recited in claim 2 wherein said clattering preventing means comprises a cork pad.

4. A holder as recited in claim 1 further comprising a plurality of fastening means for releasably attaching said rods to said top and bottom plate members.

5. A holder as recited in claim 4 wherein said rods are tubular and wherein said plurality of fastening means for releasably attaching said rods to said top and bottom plate members include a bolt associated with each rod and passing through said top plate member, a said resilient material washer, said rod and said bottom plate, and a nut associated with each bolt affixing the bolt in position to hold said plates, washers and rods together.

6. A holder as recited in claim 5 further comprising a metal washer placed between each rod and its associated resilient material washer to prevent damage to said resilient material washers.

7. A holder as recited in claim 1 wherein said resilient material washers are polyethylene.

8. A holder as recited in claim 1 wherein said bottom plate member is substantially circular in shape.

9. A holder as recited in claim 1 wherein said extension means comprises two elongated strips on generally the same side of said top plate member and spaced from each other, both of said strips being adapted to be formed into loops for attachment around a bicycle handlebar or the like.

10. A holder as recited in claim 9 wherein each of said strips is arched and has a slot formed therein so that said strips may be readily formed into loops for attachment around a bicycle handlebar or the like.

* * * * *